(12) United States Patent
Caritu et al.

(10) Patent No.: US 7,711,516 B2
(45) Date of Patent: May 4, 2010

(54) METHOD FOR ESTIMATING MOVEMENT OF A SOLID

(75) Inventors: Yanis Caritu, Saint Joseph de Riviere (FR); Christelle Godin, Brignoud (FR); Alain Barraud, Froges (FR); Suzanne Lesecq, Froges (FR)

(73) Assignees: Commissariat a l'Energie Atomique, Paris (FR); Universite Joseph Fourier, Grenoble (FR); Institut National Polytechnique de Grenoble, Grenoble (FR)

( * ) Notice: Subject to any disclaimer, the term of this patent is extended or adjusted under 35 U.S.C. 154(b) by 23 days.

(21) Appl. No.: 12/158,631

(22) PCT Filed: Dec. 21, 2006

(86) PCT No.: PCT/FR2006/002831

§ 371 (c)(1),
(2), (4) Date: Jun. 20, 2008

(87) PCT Pub. No.: WO2007/077346

PCT Pub. Date: Jul. 12, 2007

(65) Prior Publication Data

US 2008/0270068 A1    Oct. 30, 2008

(30) Foreign Application Priority Data

Dec. 23, 2005    (FR) .................................. 05 13269

(51) Int. Cl.
*G01C 9/08*    (2006.01)
*G01C 17/02*    (2006.01)

(52) U.S. Cl. ........................ 702/153; 33/356; 702/151; 702/158

(58) Field of Classification Search ................. 702/145, 702/150, 151, 153, 158; 33/356
See application file for complete search history.

(56) References Cited

U.S. PATENT DOCUMENTS 7,269,532 B2    9/2007    David et al. ................. 702/151

(Continued)

FOREIGN PATENT DOCUMENTS

FR    2 838 185    10/2003

(Continued)

OTHER PUBLICATIONS

English Translation of International Preliminary Report on Patentability (7 pgs). PCT/FR2006/002831.

(Continued)

*Primary Examiner*—John H Le
(74) *Attorney, Agent, or Firm*—Brinks Hofer Gilson & Lione

(57) ABSTRACT

The method estimates movement of a solid mobile in a medium capable of generating disturbances defined by a three-variable vector, wherein the movement is defined by a six-variable vector and the solid is equipped with at least one sensor sensitive to acceleration having at least three sensitive axes and at least one sensor sensitive to the magnetic field having at least three sensitive axes. The method for estimating the movement of a solid includes a step of calculating a nine-variable vector consisting of the six-variable movement vector and of the three-variable disturbance vector and a step of weighting the nine-variable vector capable of transforming the nine-variable vector into a vector with not more than five variables to be estimated.

12 Claims, 2 Drawing Sheets

U.S. PATENT DOCUMENTS

| | | | |
|---|---|---|---|
| 7,460,975 B2 * | 12/2008 | David | 702/145 |
| 2002/0100178 A1 | 8/2002 | Smith et al. | 33/356 |
| 2005/0125191 A1 | 6/2005 | David et al. | 702/150 |

FOREIGN PATENT DOCUMENTS

| | | |
|---|---|---|
| WO | WO 2007/077346 A3 | 7/2007 |

OTHER PUBLICATIONS

International Search Report, Jul. 12, 2007. (PCT/FR2006/002831).

PCT Request in French. (PCT/FR2006/002831).

PCT Written Opinion in French. (PCT/FR2006/002831).

Marins, et al., "An Extended Kalman Filter for Quaternion-Based Orientation Estimation Using MARG Sensors", Proceedings of the 2001 IEEE/RSI International Conference on Intelligent Robots and Systems, Oct. 2001.

Non-Final Office Action, Dated Jun. 22, 2009—for U.S. Appl. No. 12/108,981, filed Apr. 24, 2008—(8 pgs.).

* cited by examiner

METHOD FOR ESTIMATING MOVEMENT OF A SOLID

CROSS REFERENCE TO RELATED APPLICATION

Related subject matter is disclosed in commonly-assigned, co-pending patent application Ser. No. 12/108,981, filed Apr. 24, 2008.

PRIORITY CLAIM

This application is a U.S. nationalization of PCT Application No. PCT/FR2006/002831, filed Dec. 12, 2006, and claims priority to French Patent Application No. 0513269, filed Dec. 23, 2005.

TECHNICAL FIELD

The present invention concerns a method of estimating movement of a solid.

Generally speaking, the present invention concerns the field of attitude centers for determining the position of a solid in space.

BACKGROUND

An attitude center is made up of accelerometers and magnetometers and is adapted to perform processing to determine the orientation in space of a solid carrying the attitude center.

One such device is known in particular from the French document FR 02 04260.

The device described in that document produces an estimate of angles of rotation of the solid up to 360° and is completely autonomous of the medium in which the solid is moving.

Moreover, such attitude centers do not necessitate the use of rate gyros, which reduces the cost of the device and its overall size.

The attitude center described in the document FR 02 04260 treats the orientation of the solid as an unknown in the measurement model and the processing of the signals coming from the attitude center.

If the acceleration of the movement of the solid is high compared to the gravitational acceleration, the estimated angles are subject to error since the acceleration caused by the movement of the solid is associated with the acceleration caused by gravity.

Moreover, the very medium in which the solid moves can generate magnetic disturbances that are not taken into account by the prior art attitude center.

SUMMARY

An object of the present invention is to overcome the aforementioned drawbacks and to propose a method for estimating the movement of a solid, used in this kind of attitude center, offering improved performance over the method described in the document FR 02 04 260 in terms of estimation of usable data, calculation cost and the accuracy and robustness of the results.

To this end, the present invention is directed to a method of estimating movement defined by a vector with six variables of a solid mobile in a medium liable to generate disturbances defined by a vector with three variables, said solid being equipped with at least one acceleration sensor having at least three sensitive axes and at least one magnetic field sensor having at least three sensitive axes.

According to the invention, the estimation method includes a step of producing a vector with nine variables consisting of said movement vector with six variables and said disturbance vector with three variables and a step of weighting said vector with nine variables adapted to transform said vector with nine variables into a vector with at most five unknown variables to be estimated.

The estimation method of the invention therefore takes into account not only the orientation of the solid in the terrestrial magnetic and gravitational field but also the acceleration caused by the movement as well as disturbances, such as magnetic disturbances occurring in the medium in which the solid is moving, thanks to the introduction of new parameters represented by the vector with nine variables.

Depending on the conditions of motion of the solid and the medium in which it is moving, it is possible to weight the vector with nine variables by assuming at least four variables of that vector to be known.

Thanks to the acceleration sensors and the magnetic field sensors each having three sensitive axes, it is possible to determine five unknown variables of the vector so weighted.

Thanks to this estimate of the movement of a solid that determines not only the orientation of a solid but also the acceleration or the disturbances of the medium, it is possible to extend the use of the solid equipped in this way with the attitude center and executing the estimation method of the invention.

It is possible in particular to capture faster movements and to use the solid in applications for which accurate and stable measurements are required.

It is equally possible to estimate the position of the solid in translation relative to a starting position.

In practice, the estimation method includes a step of choosing a movement configuration from a table of movement configurations and the weighting step is adapted to replace an unknown variable with a known value in the vector with nine variables as a function of the configuration chosen.

In fact, in a given application, the movement of the solid in space is rarely free. In particular, if the solid is mobile in a medium liable to generate magnetic disturbances, the movement configuration can be chosen from a set of movement configurations including movement in a medium with no magnetic disturbance, movement in a space with one dimension, movement in a plane and movement having at least two known degrees of freedom.

In practice, the weighting step includes a step of choosing a weighting vector adapted to modify the respective weight of the sensors equipping the solid and the method includes a step of estimating from at least one variable of the vector with nine variables having at most five unknown variables to be estimated from the measurement from at least one associated sensor.

Thus a weighting vector enables some sensors on some or all of its sensitivity axes to be ignored so that it is possible to determine only some of the variables to be estimated.

The estimation method advantageously includes at least one step of iteration of said step of choosing a weighting vector and estimating at least one variable of the vector with at most five unknown variables to be estimated, the weighting vector chosen in said choice step being different in each iteration step.

By effecting a number of passes in this way and modifying the configuration of the weighting vector, it is possible to estimate alternately the variables of the vector with at most five unknown variables to be estimated.

In one practical embodiment of the invention, the estimation method includes a step of choosing a weighting vector adapted to ignore the measurement from the acceleration sensor(s), a step of estimating at least two variables of the vector with at most five unknown variables to be estimated from the measurement from the magnetic field sensor(s), a step of choosing a weighting vector adapted to ignore the measurement from the magnetic field sensor(s) and a step of estimating at most the other three variables of said vector with at most five unknown vectors to be estimated from the measurement from the acceleration sensor(s).

Thus by initially ignoring the measurements from the acceleration sensors, it is possible to determine angles in space corresponding to the orientation of the solid using the magnetic field sensor, which is not sensitive to the acceleration of the solid.

Once these angles have been estimated, it is then possible to estimate the other variables, for example a third angle and two accelerations of the solid, using the acceleration sensor(s).

Alternatively, the estimation method includes a step of choosing a weighting vector adapted to ignore the measurement from the magnetic field sensor(s), a step of estimating at least two variables of said vector with at most five unknown variables to be estimated from the measurement from the acceleration sensor(s), a step of choosing a weighting vector adapted to ignore the acceleration sensors and a step of estimating at most the other three variables of said vector with at most five unknown variables to be estimated from the measurement from the magnetic field sensor(s).

In practice, to reduce problems in terms of calculation time, if the vector with nine variables includes a rotation vector with three degrees of freedom, the rotation vector is represented by four components of a quaternion associated with a constraint on the four components.

Using quaternion symbolism leads to quadratic functions that are simpler to solve than the trigonometric functions that impart a particular non-linear character to the equations to be solved to determine the five variables of the vector used to estimate the movement of the solid.

In practice, in the step of estimating at least one variable of said vector with at most five unknown variables to be estimated, the constraint on the components of the quaternion is integrated into the representation of the rotation vector.

In one practical embodiment of the invention, the step of estimating at least one variable of the vector with at most five unknown variables to be estimated uses a quasi-Newton type error minimizing function.

A second aspect of the invention concerns a device for estimating the movement of a solid mobile in a medium liable to generate disturbances defined by a vector with three variables, said movement being defined by a vector with six variables.

This estimator device is mounted on said solid and includes at least one acceleration sensor having at least three sensitive axes and at least one magnetic field sensor having at least three sensitive axes.

This estimator device is adapted to use the method of the invention of estimating the movement of a solid.

The device for estimating the movement of a solid has features and advantages analogous to those described hereinabove in relation to the method of the invention.

Other features and advantages of the invention will become more apparent in the course of the following description.

BRIEF DESCRIPTION OF THE DRAWINGS

In the appended drawings, provided by way of nonlimiting example.

DETAILED DESCRIPTION

Figure 1:
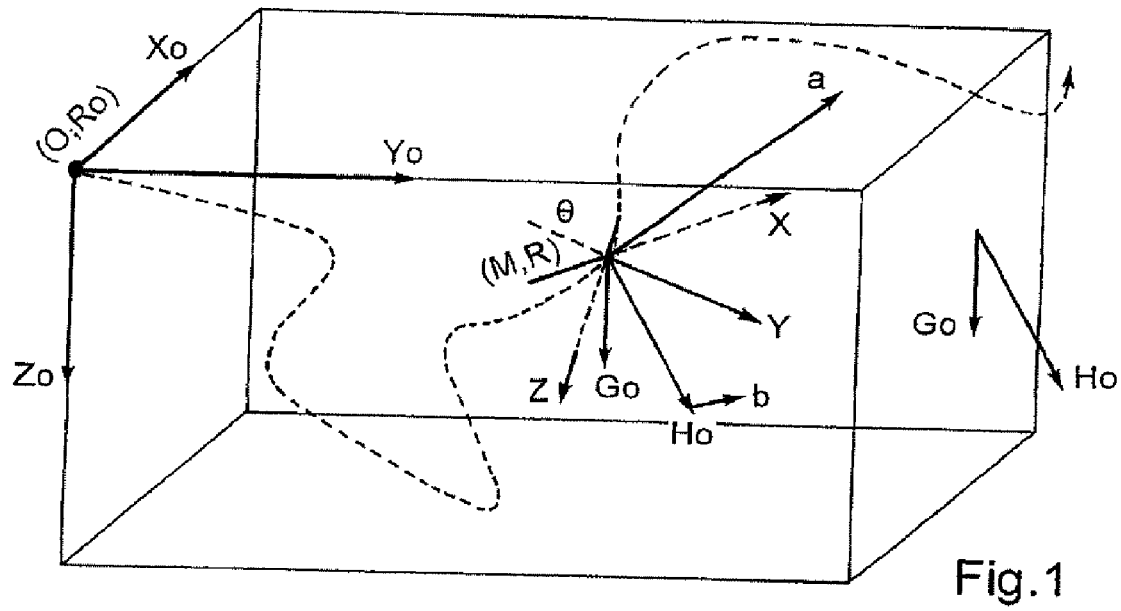
FIG. 1 is a diagram illustrating the movement of a solid that can be estimated by the movement estimation method of the invention.

The type of movement of a solid estimated by the method of the invention is described first with reference to FIG. 1.

The objective is to reconstruct over time the orientation and dynamics, i.e. the acceleration of a mobile solid carrying a measurement device. Consequently, the trajectory (the double integral of the acceleration) can also be estimated.

The mobile solid is here treated as a point and its position M is indicated in FIG. 1. Its orientation is indicated by the vector θ, which corresponds to the orientation of a system of axes R in a fixed system of axes Ro (which can be an initial system of axes in a rest phase at the point 0).

Moreover, at any time, the acceleration inherent to the movement is denoted a. The measuring device is also sensitive to the acceleration caused by gravity, denoted Go, and the ambient terrestrial magnetic field, denoted Ho (magnetic field measured at rest). Any magnetic disturbances at the location of the mobile add a magnetic contribution denoted b.

Here, by way of nonlimiting example, the axis Z of the fixed system of axes Ro is aligned with the vertical and thus with Go.

According to the Galileo-Einstein principle, the resulting measurable acceleration at M is the non-gravitational acceleration, i.e. the acceleration proportional to: a−GO.

The resultant measurable magnetic field at M is Ho+b.

The movement of the solid is defined by a vector with six variables corresponding to the inherent movement of the solid. Three first variables correspond to three dimensions in rotation, i.e. to the orientation indicated by the vector θ.

Three other variables correspond to the position of the solid in the system of axes R, thus corresponding to the coordinates X, Y, Z in the system of axes R. These coordinates can be deduced by double integration of the acceleration vector a of the mobile, which will thus be chosen as a variable of the movement.

Moreover, given the medium in which the solid is moving, the latter can be defined by a vector with three variables representing any magnetic disturbances b.

As a general rule, nine variables describe the system observed in movement in its environment.

Thus when the solid is in an initial position at rest, a vector Po can be defined such that:

$$Po=(Go,Ho)$$

where:

Go of dimension 3 corresponds to the acceleration caused by gravity,

Ho of dimension 3 corresponds to the terrestrial magnetism, (M, R)=(O, Ro), and vector θ=0.

When the solid begins to move, a vector p is added to the initial vector Po.

The vector p is defined as follows p=(a, b), where a and b are vectors of dimension 3.

The total field measured by the measurement device thus corresponds to the sum of the vectors Po+p.

There is thus obtained a vector with nine variables defining the movement of the solid in which the unknowns are the angles of the vector θ, the acceleration a of the solid and the magnetic disturbance b.

Different embodiments of a device of the invention for estimating movement are described next with reference to FIGS. 2A, 2B and 2C.

The estimator device consists only of magnetometers and accelerometers. It is mounted on the solid whose movement is to be estimated.

Figure 2A:
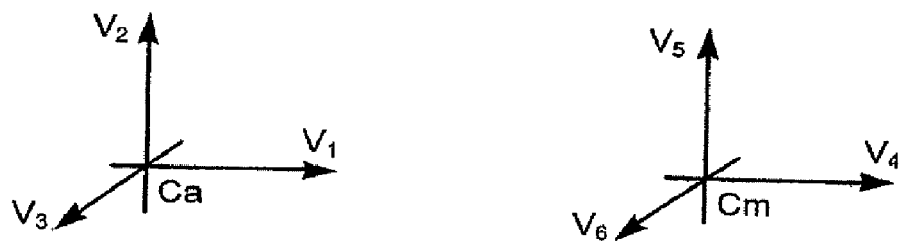
FIGS. 2A, 2B, 2C are diagrammatic representations of devices for estimating the movement of a solid conforming to three embodiments of the invention.

As shown in FIG. 2A, the movement estimator device must include at least one acceleration sensor Ca having at least three sensitive axes V1, V2, V3 and at least one magnetic field sensor Cm also having three sensitive axes V4, V5, V6.

Figure 2B:
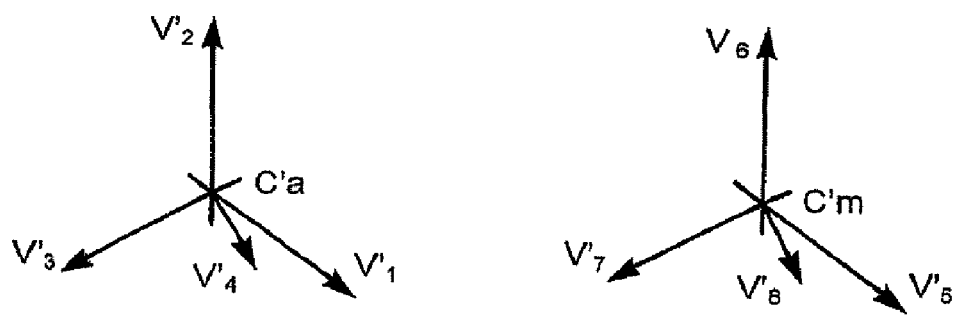

In another embodiment, as shown in FIG. 2B, each sensor C'a and C'm can have four respective sensitive axes so that the acceleration sensor C'a has the sensitive axes V'1, V'2, V'3, V'4 and the magnetic field sensor C'm has the sensitive axes V'5, V'6, V'7, V'8.

Figure 2C:
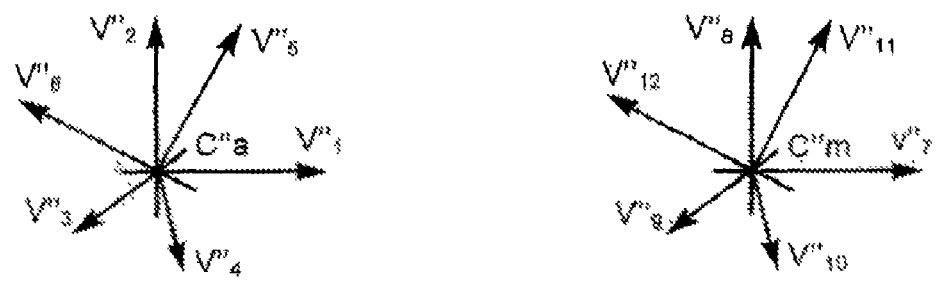

Similarly, to improve the reliability of the measurements in the manner shown in FIG. 2C, the estimator device can include two acceleration sensors C''a each having three sensitive axes V''1, V''2, V''3, V''4, V''5, V''6 and two magnetic field sensors C''m each having three sensitive axes V''7, V''8, V''9, V''10, V''11 and V''12.

In practice, the estimator device of the invention must have at least as many sensitive axes as there are unknown parameters to be estimated in the movement of the solid equipped with the device.

Moreover, depending on the type of variables to be estimated, some sensors must not be missing. In particular, it is not possible to estimate a horizontal azimuth angle correctly without a magnetometer whose projection in the horizontal plane is non-zero.

Moreover, the more sensitive axes there are in different directions, the better the estimate of the parameters since the signal to noise ratio is increased. However, the estimated device has a cost directly dependent on the number of acceleration sensors or magnetic field sensors used.

In practice, the two systems of measuring axes V1, V2, V3 and V4, V5, V6 coincide at the same point. For clarity, they are spatially separated in FIGS. 2A, 2B, 2C.

In practice, it is not possible to superpose the sensors Ca and Cm at the same point, but the error introduced is low if microsensors are used.

Three non-aligned sensitive axes are sufficient for each type of accelerometer or magnetometer sensor. Beyond this number, as is well known in signal processing, it is the signal to noise ratio that is increased and better distributed over the operating range.

Figure 3:
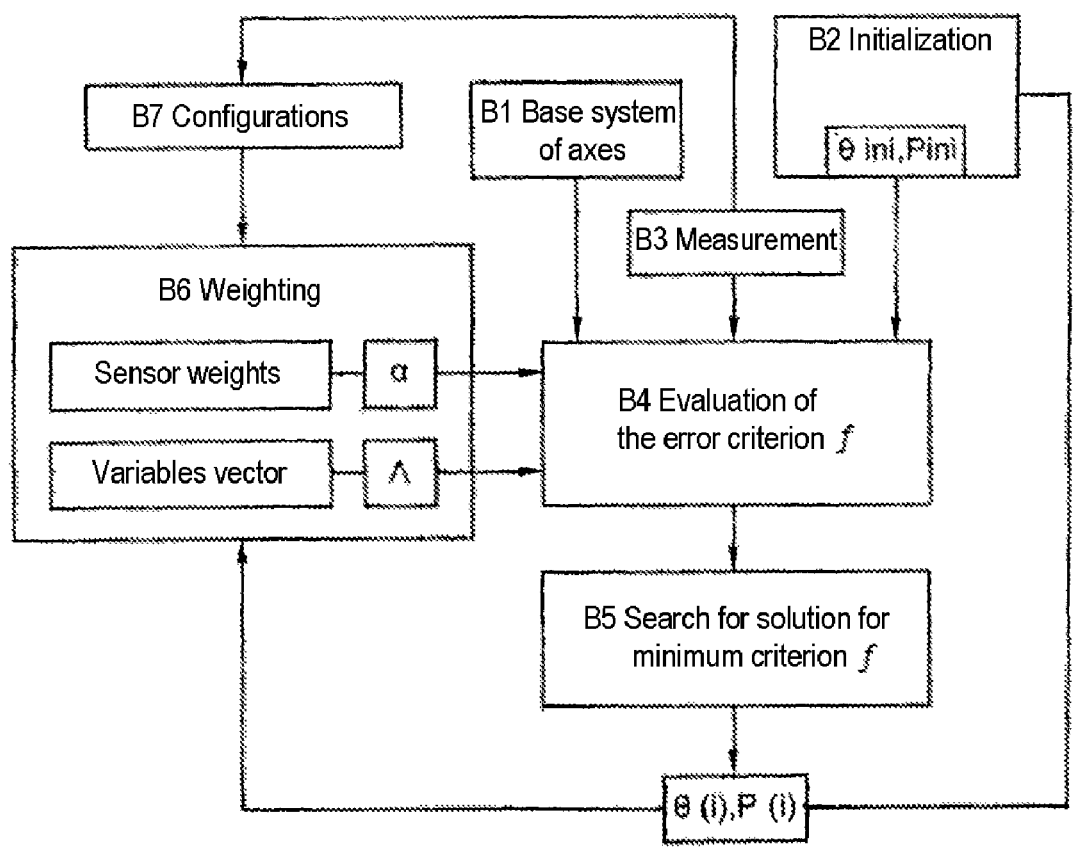
FIG. 3 is a block diagram illustrating the method of the invention for estimating the movement of a solid.

The method of the invention for estimating the movement of a solid is described next with reference to FIG. 3.

The method includes a step B1 of defining the basic system of axes Ro, which can be a fixed system of axes defined by its geophysical coordinates such as latitude and longitude or in a relative manner by considering that it is the position of the solid at an initial time t=0.

The position of the mobile system of axes Ro thus corresponds to the initial measurements provided by the sensors V(t) with t=0.

As described hereinabove, this initial position is assigned a terrestrial magnetic field Ho and a gravitational acceleration Go.

An initialization step B2 is also carried out to define the initial values at a time T=0 of the rotation vector θ and the disturbance vector p.

A measurement step B3 is then executed at each time in order to produce a measurement V(t).

The general principle of the processing of this measurement is described next.

The measurement V(t) is a representation of the complete physical field Po+p in the system of axes of the sensors. In order to express the nine unknown variables caused by the movement and the magnetic disturbances in the fixed system of axes Ro, the necessary successive operations to obtain the measurement from the physical field Po+p (expressed in the system of axes Ro) are as follows:

expression of the rotation θ of the fixed system of axes in the mobile system of axes, projection of the field Po+p onto the mobile system of axes, projection of the result into the known oriented sensing system of axes θj attached to the mobile system of axes (this operation is omitted for sensors whose axes coincide with those of the chosen mobile system of axes).

The expression for the theoretical measurement (or measurement model) as a function of the field is therefore of the form:

$$V_{mod}(j)=proj_{\theta j}[R_\theta(Po+p)]$$

The inverse direct function is not explicit in the general case and error minimization methods are used in an evaluation step B4, the criterion to be minimized being:

$$f(\theta, p) = \sum_{j=1}^{Na+Nb} \alpha_j(V_{mod}(j) - V(j))^2$$

in which the new parameter $\alpha_j$ represents weighting of the contribution of the sensor along a sensitive axis j and Na+Nb corresponds to the total number of sensitive axes of the magnetic field and acceleration sensors.

The vector $\alpha=(\alpha_1, \alpha_2, \ldots \alpha_j \ldots \alpha_{Na+Nb})$ is of dimension Na+Nb and is used to weight the measurement from the sensors according to their various sensitive axes. For a tilt-compensated compass, for example, using the measurement on two axes of the accelerometer gives an inclination relative to the vertical and using the measurement along four axes of the magnetometer gives the angle in the inclined plane.

This weighting vector α can be imposed by the user or updated adaptively according to trust criteria that are assigned to the measurement according to the sensitive axes of the various sensors:

$\alpha_j=1$: trust, $\alpha_j=0$: set aside the measurement given by a sensor on the sensitive axis j.

A greater or lesser contribution to the measurement information can be expressed between these two extreme values.

For example, if the sensor is more effected by noise than the others, a weighting coefficient inversely proportional to the variance will be chosen.

The formulation of the rotation function θ can be expressed by a matrix composition (trigonometric function) in a particular system (Euler, Cardan, etc.) or by quaternions (quadratic function), as described hereinafter.

In all cases, the affine measurement model is expressed as a function of the unknown p:

$$V_{mod}(j)=A(\theta) \times p + B(\theta)$$

where $A(\theta)$ and $B(\theta)$ are functions of the vector $\theta$.

The processing must optimize $(\theta, p)$ so that the criterion f is at a minimum. The calculation step B5 therefore aims to resolve the function:

$$\min_{(\theta,p)} f(\theta, p) = \min_{\theta}\{\min_{p}(f(\theta, p))\}$$

The resolution in p being linear, the least squares solution in p is an explicit solution.

A quasi-Newton type error minimization function is preferably used.

To simplify the calculations, the rotation vector with three degrees of freedom can be represented by four components of a quaternion associated with a constraint on those four components.

In fact, the standard mathematical expression for the rotation vector is that of the matrices of angles. The final expression includes a large number of trigonometric functions which gives a particular non-linear character to the criterion and causes problems in terms of calculation time.

It is preferable to use the quaternion symbolism that yields quadratic functions. The three degrees of orientation are then represented by four components:

$$q=(q_0 q_1 q_2 q_3)$$

where:

$$q_0 = \cos(x_1)$$

$$q_1 = \sin(x_1) u_x$$

$$q_2 = \sin(x_1) u_y$$

$$q_3 = \sin(x_1) u_z$$

where u are the coordinates of the rotation axis. These four components, if they represent a rotation, conform to the constraint:

$$\Sigma q_i^2 = 1$$

Furthermore, in the calculation step B5, to avoid using constrained optimization methods, an "integrated constraint" can be used in the rotation vector:

either by considering all the following possible cases:

$$u = \frac{1}{\sqrt{1+x_2^2+x_3^2}} \begin{pmatrix} 1 \\ x_2 \\ x_3 \end{pmatrix} \text{ or } u = \frac{1}{\sqrt{1+x_1^2+x_3^2}} \begin{pmatrix} x_1 \\ 1 \\ x_3 \end{pmatrix} \text{ or } \ldots$$

or by expressing the rotation axis in spherical coordinates:

$$q = \begin{pmatrix} \cos(x_1) \\ \sin(x_1)u \end{pmatrix} \text{ and } u = \begin{pmatrix} \cos(x_2)\cos(x_3) \\ \sin(x_2)\cos(x_3) \\ \sin(x_3) \end{pmatrix}$$

According to the invention, to facilitate resolving the criteria f to be minimized as described hereinabove, a weighting step B6 weights the vector with nine variables to transform it into a vector with at most five unknown variables to be estimated.

This weighting vector depends in particular on choosing a movement configuration from a movement configuration table in a configuration choice step B7.

This step B7 of choosing a configuration is preferably effected automatically at least in standard cases of use of the device.

The nine variables are denoted as follows hereinafter:

$$(\theta = \theta_0 \theta_1 \theta_2, \; p = a_0 a_1 a_2 b_0 b_1 b_2)$$

and the vector of the variables of a system:

$$\Lambda = ( \ldots \theta_{i1} \ldots \tilde{\theta}_{i2} \ldots - \ldots i_1, i_2 \in \{0,1,2\}, \tilde{a}_{j1} \ldots \\ a_{j2} \ldots - \ldots j_1, j_2 \in \{0,1,2\}, \tilde{b}_{k1} \ldots b_{k2} \ldots - \ldots \\ k_1, k_2 \in [0,1,2])$$

where:

the notation Xi indicates an unknown variable to be determined, the notation "-" indicates that the problem does not depend on this variable (this is the case where some sensors are ignored), the notation $\tilde{X}i$ indicates a known value substituted for the variable.

The particular case of weighting this vector $\Lambda$ when there are no magnetic disturbances or the magnetic disturbances are known is described next.

This situation groups all applications in which the mobile is not moving in a terrestrial magnetic environment disturbed by intrusive and unknown ferromagnetic masses.

This is the case in particular of a person executing sporting movements in a stadium or in a room and at least one meter from steel equipment.

This application is also encountered when a mobile is in a situation in which the magnetic disturbances can be predicted, for example if the sensor is attached to a ferromagnetic object whose physical characteristics are known (sensor in a mobile telephone, battery, automobile bodywork, vehicles of all kinds, etc.).

The configuration of the movement can be known in advance or predicted in the step B7 of choosing a configuration.

The variables linked to the magnetic disturbance being zero or known, the six unknown variables correspond to the movement vector of the solid.

It is necessary to know one of these orientation and/or acceleration variables of the solid.

The step B7 of choosing a configuration also determines one of these variables in advance, as a function of the type of movement.

For example, if the sensor is placed on a structure such as a limb of a person or a robot arm, the angular degrees of freedom are often strictly less than three, as in the case of joints in man (elbow, knee, ankle, wrist) or a rotation motor for robot arms (one or two joint motors).

Similarly, for a suspended system such as a wheeled vehicle, under good conditions of adhesion the springs allow movement in pitch and roll, i.e. with two rotation angles, and the third, corresponding to the heading, can be given by another system, for example a GPS.

Similarly, at the acceleration level, it is possible to know in advance one of the variables, especially if the translation movement is accelerated in a plane, as is the case for a vehicle on the road, or a train, in which case the acceleration in a direction perpendicular to the plane is zero.

Thus the weighting step B6 on the one hand weights the vector with nine variables in order to consider as zero or known certain of the variables and to weight the weighting vector α described hereinabove in order to facilitate the calculation of the criterion f to be minimized by ignoring one or more sensors.

For example, a weighting vector α is chosen adapted to ignore the measurements from the acceleration sensors:

$$\alpha = \left( \underbrace{0\ 0\ 0}_{accel}\ \underbrace{1\ 1\ 1}_{magnet} \right)$$

If there is no magnetic disturbance b or if the magnetic disturbance is known, a magnetic field sensor having three sensitive axes can determine the orientation of the solid in two dimensions. Furthermore, these magnetometric sensors are not sensitive to acceleration and so it is possible to determine the orientations of the solid independently of its acceleration.

To increase sensitivity, the reference system of axes is preferably chosen to have an axis Z colinear with the magnetic field.

The thus weighted vector with nine variables is written:

$$\left( \underbrace{-\theta_2 \theta_3}_{orientation}\ \underbrace{-\ -\ -}_{accelerations}\ \underbrace{\tilde{b}_1 \tilde{b}_2 \tilde{b}_3}_{disturbances} \right)$$

As indicated hereinabove, the step B4 of evaluating the criterion and the calculation step B5 are executed using the weighting vector α and the weighted vector Λ to estimate the value of the angles $\theta_2$ and $\theta_3$ corresponding to the orientation in two directions of the solid.

Then an iteration step iterates the weighting steps B6, modifying the weighting vector α.

Thus, in the weighting step B6, a weighting vector α is chosen that is adapted to ignore the measurement from the magnetic field sensors:

$$\alpha = \left( \underbrace{1\ 1\ 1}_{accel}\ \underbrace{0\ 0\ 0}_{magnet} \right)$$

In parallel with this, the weighted vector with nine variables is written as follows:

$$\left( \underbrace{\theta_1 \tilde{\theta}_2 = \tilde{\theta}_2 \tilde{\theta}_3 = \tilde{\theta}_3}_{orientation}\ \underbrace{\alpha_1 \alpha_2 \tilde{\alpha}_3}_{accelerations}\ \underbrace{-\ -\ -}_{disturbances} \right)$$

in which the orientation angles $\theta_2$ and $\theta_3$ are estimated by the values calculated beforehand and the unknown variable $a_3$ corresponding to acceleration is replaced by a known value determined as a function of the chosen configuration.

It is thus possible by iterating the step (B4) of evaluating the error criterion and the calculation step (B5) to determine the accelerations $a_1$ and $a_2$.

Thus, in the previous example, the measurements given by the magnetic field sensors determine two states linked to the orientation $\theta_1$ and $\theta_2$ of the solid. In a second phase, the measurements given by the acceleration sensors are used to estimate three other variables, for example one variable linked to the orientation $\theta_3$ and two variables linked to the accelerations $a_1$ and $a_2$ of the solid.

Of course, as a function of the configuration of the movement of the solid, if the value of the third orientation parameter $\theta_3$ can be estimated easily or given by another measuring system such as a GPS, it is possible to estimate the three acceleration parameters $a_1$, $a_2$, $a_3$ from the measurement given by the acceleration sensors.

Of course, the movement estimation method can be used with different movement configurations, in particular if the magnetic disturbances generated by the medium are unknown.

To solve the estimation problem, the vector with nine variables must be weighted so as to include only at most five unknown variables.

If the three variables linked to magnetic disturbances are unknown, it is necessary for the movement of the solid to have at least four known degrees of freedom.

This is the case in particular for the movement of the head of a walker about the two rotation axes. For this type of movement, the configuration of the movements considers that the accelerations are virtually zero.

Similarly, if the solid is moving in a flat plane, there is only one rotation angle, corresponding to the heading of the movement in the plane, and two unknown accelerations of the movement of the mobile in that plane on two axes of the plane.

Any magnetic disturbance in the plane can also be determined by the movement estimation method.

In practice, the resolution mode is the same as that described hereinabove, only the formalism between the measurements made by the magnetic field sensors and the acceleration sensor being exchanged.

In the foregoing examples, it was considered possible in the step B7 of choosing a configuration to determine certain parameters of magnetic disturbances or the orientation of the solid or the acceleration in known manner as a function of the configuration of the movement.

The device can equally seek to associate a certain mode of operation that automatically establishes a known movement configuration.

Thus it is possible to set parameters of a "car" mode of operation that corresponds to the movement of a solid in a plane, a "bike" mode, corresponding to the movement in a plane of a solid causing no magnetic disturbances, or a "head movement" mode for which the accelerations are virtually zero.

In practice, the choice of the configuration for determining at least four variables of the vector with nine unknown variables to be estimated can be dynamic and depend in particular on the surveillance of the modulus of the magnetic field.

Thus in the step B7 of choosing a configuration, automatic surveillance of the modulus of the magnetic field can be used to take account progressively of the presence of a source of magnetic disturbance, such as the presence of a ferromagnetic object generating magnetic disturbances affecting the sensors equipping the moving solid.

Thus the difference between the norm of the magnetic field calculated from real measurements and that predicted is monitored.

As soon as that difference is too high, of the order of 10%, the criterion of trusting the estimate is diminished proportionately.

Similarly, the step B7 of choosing a configuration can include automatic surveillance of the modulus of the measured acceleration field.

Thus when the difference a–Go becomes greater than 10% Go, the acceleration can no longer be ignored or regarded as constant.

Of course, the present invention is not limited to the embodiments described hereinabove.

In particular, the measuring device can interchangeably include sensors having three sensitive axes or three sensors each having only one sensitive axis disposed triaxially.

Moreover, the weighting vector α can include weighting coefficients between the values 0 and 1.

The invention claimed is:

1. A method for estimating movement of a solid mobile defined by a movement vector with six variables in a medium liable to generate disturbances defined by a disturbance vector with three variables, wherein the solid mobile is equipped with at least one acceleration sensor having at least three sensitive axes and at least one magnetic field sensor having at least three sensitive axes, the method comprising:
    producing a vector with nine variables including the movement vector with six variables and the disturbance vector with three variables, and
    weighting the vector with nine variables to transform the vector with nine variables into a vector with at most five unknown variables to be estimated.

2. The method according to claim 1, further comprising choosing a movement configuration from a table of movement configurations and wherein the weighting step comprises replacing an unknown variable with a known value in said vector with nine variables as a function of said configuration chosen.

3. The method according to claim 2, wherein said solid is mobile in a medium liable to generate magnetic disturbances, said movement configuration being chosen from a set of movement configurations including movement in a medium with no magnetic disturbance, movement in a space with one dimension, movement in a plane and movement having at least two known degrees of freedom.

4. The method according to claim 1, wherein the weighting step comprises choosing a weighting vector adapted to modify the respective weight of said acceleration sensor and said magnetic field sensor and said method further comprises estimating at least one variable of said vector with at most five unknown variables to be estimated from a measurement from at least one of said acceleration sensor and said magnetic field sensor.

5. The method according to claim 4, further comprising iterating said step of choosing the weighting vector and said steps of estimating at least one variable of the vector with at most five unknown variables to be estimated, the weighting vector chosen in said choosing step being different in each iteration.

6. The method according to claim 4, further comprising:
    choosing the weighting vector adapted to ignore the measurement from the acceleration sensor,
    estimating at least two variables of said vector with at most five unknown variables to be estimated from the measurement from the magnetic field sensor,
    choosing the weighting vector adapted to ignore the measurement from the magnetic field sensor; and
    estimating at most the other three variables of said vector with at most five unknown vectors to be estimated from the measurement from the acceleration sensor.

7. The method according to claim 4, further comprising:
    choosing the weighting vector adapted to ignore the measurement from the magnetic field sensor,
    estimating at least two variables of said vector with at most five unknown variables to be estimated from the measurement from the acceleration sensor,
    choosing the weighting vector adapted to ignore the acceleration sensor; and
    estimating at most the other three variables of said vector with at most five unknown variables to be estimated from the measurement from the magnetic field sensor.

8. The method according to claim 4, wherein said vector with nine variables comprises a rotation vector with three degrees of freedom represented by four components of a quaternion associated with a constraint on said four components.

9. The method according to claim 8, wherein in the step of estimating at least one variable of said vector with at most five unknown variables to be estimated, said constraint on the four components of the quaternion is integrated into the representation of the rotation vector.

10. The method according to claim 4, wherein the step of estimating at least one variable of said vector with at most five unknown variables to be estimated comprises using a quasi-Newton type error minimizing function.

11. The method according to claim 1, wherein the weighting step comprises weighting the vector with nine variables in accordance with movement conditions of the mobile solid and of said medium liable to generate disturbances.

12. A device for estimating a movement of a solid mobile in a medium liable to generate disturbances defined by a vector with three variables, said movement being defined by a vector with six variables, said device being mounted on said solid and including at least one acceleration sensor having at least three sensitive axes and at least one magnetic field sensor having at least three sensitive axes, wherein the device is adapted to:
    produce a vector with nine variables consisting of said vector with six variables and said vector with three variables, and
    weight said vector with nine variables to transform said vector with nine variables into a vector with at most five unknown variables to be estimated.

* * * * *